United States Patent
Kaneda et al.

(10) Patent No.: US 10,943,094 B2
(45) Date of Patent: Mar. 9, 2021

(54) INFORMATION PROCESSING APPARATUS FOR ESTIMATING AGE AND METHOD THEREOF

(71) Applicant: CANON KABUSHIKI KAISHA, Tokyo (JP)

(72) Inventors: Yuji Kaneda, Kawasaki (JP); Takahisa Yamamoto, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 16/255,676

(22) Filed: Jan. 23, 2019

(65) Prior Publication Data
US 2019/0236337 A1    Aug. 1, 2019

(30) Foreign Application Priority Data

Jan. 29, 2018 (JP) .............................. JP2018-012406

(51) Int. Cl.
- *G06K 9/00* (2006.01)
- *G06K 9/46* (2006.01)
- *G06K 9/62* (2006.01)

(52) U.S. Cl.
CPC ....... *G06K 9/00281* (2013.01); *G06K 9/4642* (2013.01); *G06K 9/6271* (2013.01); *G06K 2009/00322* (2013.01)

(58) Field of Classification Search
CPC ........... G06K 9/00201; G06K 9/00248; G06K 9/00268; G06K 9/00281; G06K 9/00288;
(Continued)

(56) References Cited

U.S. PATENT DOCUMENTS

| | | | |
|---|---|---|---|
| 8,498,491 B1* | 7/2013 | Steffens | G06K 9/6292 382/224 |
| 2012/0308087 A1* | 12/2012 | Chao et al. | G06K 9/00221 382/115 |

(Continued)

FOREIGN PATENT DOCUMENTS

JP    2014-153815 A    8/2014    ............... G06T 7/00

OTHER PUBLICATIONS

Paul Viola, Michael Jones, Rapid Object Detection using a Boosted Cascade of Simple Features, Accepted Conference on Computer Vision and Pattern Recognition 2001,(1-9); Proc. of CVPR, vol. 1, pp. 511-518.

(Continued)

*Primary Examiner* — Andrew W Johns
(74) *Attorney, Agent, or Firm* — Canon U.S.A., Inc. I.P. Division

(57) ABSTRACT

An information processing apparatus includes an extraction unit that extracts a feature from an image including a face, a first estimation unit that estimates a likelihood of the face with respect to each generation based on the feature, a storage unit that stores a plurality of samples, the plurality of samples each including a generation-specific combination of likelihoods and a correct age as a pair, a selection unit that selects a sample from the storage unit based on a combination of likelihoods estimated by the first estimation unit, and a second estimation unit that estimates an estimated age of the face and an error range thereof based on the sample selected by the selection unit.

20 Claims, 19 Drawing Sheets

(58) Field of Classification Search
CPC ....... G06K 2009/00322; G06K 9/4642; G06K 9/6271; G06T 2207/30201
See application file for complete search history.

(56) References Cited

U.S. PATENT DOCUMENTS

2012/0314957 A1* 12/2012 Narikawa .......... G06K 9/00308
382/195
2014/0219518 A1* 8/2014 Yamazaki et al. ..........................
G06K 9/00268
382/118
2016/0275337 A1* 9/2016 Shibutani ................ G06K 9/03

OTHER PUBLICATIONS

Xudong Cao, et. al., Face Alignment by Explicit Shape Regression, Int J. Comput Vis DOI 10.1007/s11263-013-0667-3, 2012, CVPR, pp. 2887-2894.
M. Bertozzi, et. al., A Pedestrian Detector Using Histograms of Oriented Gradients and a Support Vector Machine Classifier, Proceedings of the 2007 IEEE, Intelligent Transportation Systems Conference, Seattle, WA, USA, Sep. 30-Oct. 3, 2007, MoD2.2, 1-4244-1396-6/07/$25.00 2007 IEEE 143-148.

* cited by examiner

INFORMATION PROCESSING APPARATUS FOR ESTIMATING AGE AND METHOD THEREOF

BACKGROUND

Field

The present disclosure relates to an information processing apparatus for estimating age from a captured face image, and a method thereof.

Description of the Related Art

There has recently been a growing trend to estimate age and sex from face images obtained from a camera and using the estimations for marketing or security purposes. Under the circumstances, there are techniques for inputting a face image into generation-specific classifiers and estimating age based on the output results thereof. An example of such a technique is discussed in Japanese Patent Application Laid-Open No. 2014-153815.

It is extremely difficult to estimate the exact age from only the appearance of a face image in image recognition, just like humans have difficulty in estimating other people's age.

SUMMARY

According to an aspect of the present disclosure, an information processing apparatus includes an extraction unit configured to extract a feature from an image including a face, a first estimation unit configured to estimate a likelihood of the face with respect to each generation based on the feature, a storage unit storing a plurality of samples, the plurality of samples each including a generation-specific combination of likelihoods and a correct age as a pair, a selection unit configured to select a sample from the storage unit based on a combination of likelihoods estimated by the first estimation unit, and a second estimation unit configured to estimate an estimated age of the face and an error range thereof based on the sample selected by the selection unit.

Further features will become apparent from the following description of exemplary embodiments with reference to the attached drawings.

DESCRIPTION OF THE EMBODIMENTS

Exemplary embodiments will be described below with reference to the drawings.

A first exemplary embodiment will be described.

Figure 1:
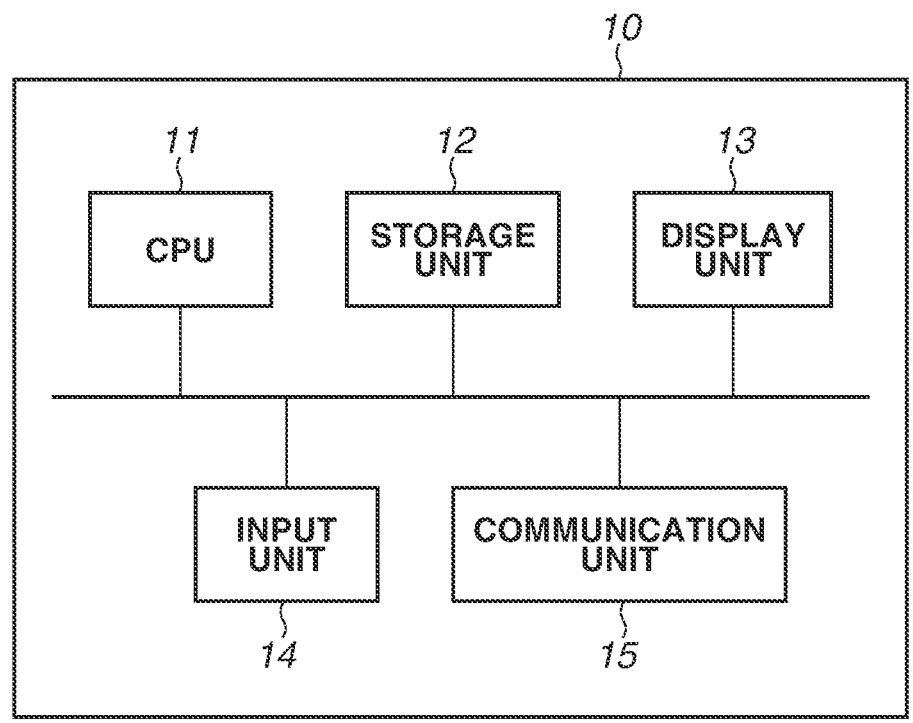
FIG. 1 is a diagram illustrating an example of a hardware configuration of an information processing apparatus.

FIG. 1 is a diagram illustrating an example of a hardware configuration of an information processing apparatus 10. The information processing apparatus 10 includes a central processing unit (CPU) 11, a storage unit 12, a display unit 13, an input unit 14, and a communication unit 15 as its hardware configuration. The CPU 11 controls the entire information processing apparatus 10. The storage unit 12 is, for example, a memory. The storage unit 12 stores a program, images, and information needed for the CPU 11 to perform processing. The display unit 13 displays a result of processing of the CPU 11 under the control of the CPU 11. The input unit 14 accepts user operations, and inputs information related to the accepted operations into the CPU 11. The communication unit 15 connects the information processing apparatus 10 to a network, and controls communication with other external apparatuses via the network under the control of the CPU 11. A functional configuration of the information processing apparatus 10 illustrated in FIG. 2 and processing of flowcharts of FIGS. 3, 8, 17, and 19 to be described below are implemented by the CPU 11 performing processing based on the program stored in the storage unit 12.

Figure 2:
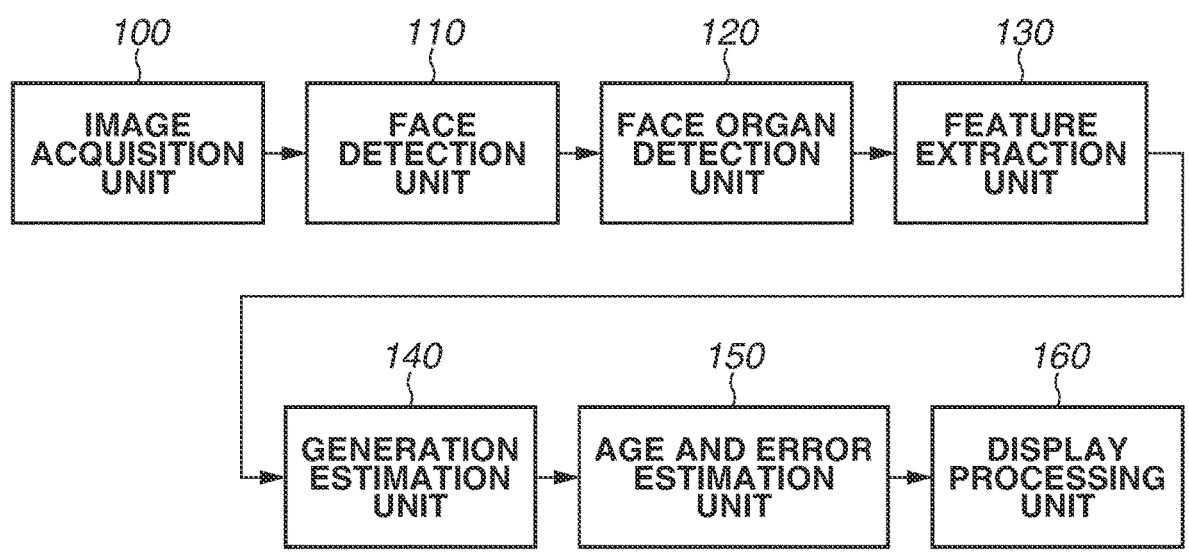
FIG. 2 is a diagram illustrating an example of a functional configuration of the information processing apparatus.

FIG. 2 is a diagram illustrating an example of the functional configuration of the information processing apparatus 10. The information processing apparatus 10 includes an image acquisition unit 100, a face detection unit 110, a face organ detection unit 120, a feature extraction unit 130, a generation estimation unit 140, an age and error estimation unit 150, and a display processing unit 160 as its functional configuration. Functions will be described with reference to the flowchart of FIG. 3.

In step S1000, the image acquisition unit 100 obtains a digital image that is obtained through a light collecting element such as a lens, an image sensor for converting light into an electrical signal, and an analog-to-digital (AD) converter for converting an analog signal into a digital signal. Examples of the image sensor include a complementary metal-oxide-semiconductor (CMOS) sensor and a charge-coupled device (CCD) sensor. Through thinning processing, the image acquisition unit 100 can obtain, for example, an image converted into full high-definition (Full HD) resolution (1920×1080 [pixels]) or HD resolution (1280×720[pixels]).

In step S1100, the face detection unit 110 detects a face included in the image obtained in step S1000. As a technique for detecting a face (hereinafter, referred to as "face detection"), the face detection unit 110 uses a technique discussed in P. Viola, M. Jones. "Rapid Object Detection using a Boosted Cascade of Simple Features", in Proc. Of CVPR, vol. 1, pp. 511-518, December, 2001.

In step S1110, the face detection unit 110 determines whether a face is detected in step S1100. If a face is detected (YES in step S1110), the processing proceeds to step S1200. If a face is not detected (NO in step S1110), the processing returns to step S1000.

In step S1200, the face organ detection unit 120 detects face organs, such as eye corners and a mouth, in the face detected in step S1100. As a technique for detecting face organs, the face organ detection unit 120 uses a technique discussed in Xudong Cao, Yichen Wei, Fang Wen, Jian Sun, "Face Alignment by Explicit Shape Regression", CVPR, pp. 2887-2894, 2012.

Figure 4:
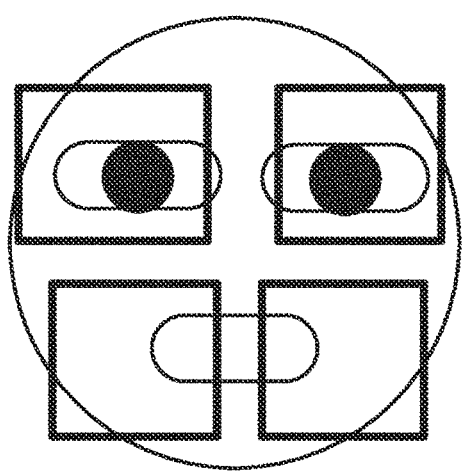
FIG. 4 is a diagram illustrating an example of feature extraction areas set for a detected face.
Figure 5:
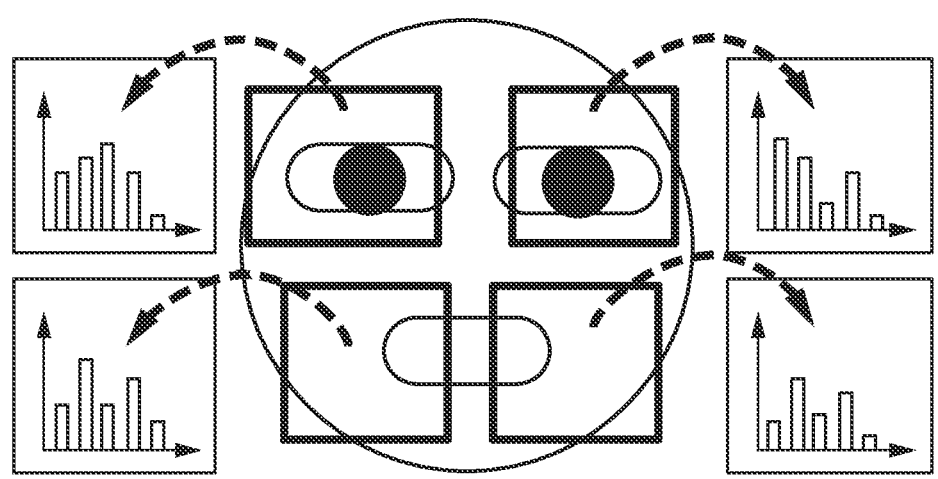
FIG. 5 is a diagram illustrating an example of extraction of luminance gradient histogram features.

In step S1300, the feature extraction units 130 sets feature extraction areas, like the rectangles in FIG. 4, based on the positions of the face organs detected in step S1200. The feature extraction unit 130 then extracts luminance gradient histogram features (luminance gradient histograms) as illustrated in FIG. 5 from the respective feature extraction areas. As a technique for extracting a luminance gradient histogram, the feature extraction unit 130 uses a technique discussed in M. Bertozzi, A. Broggi, M. DelRose, M. Felisa, A. Rakotomamonjy, and F. Suard, "A Pedestrian Detector Using Histograms of Oriented Gradients and a Support Vector Machine Classifier", IEEE Intelligent Transportation Systems Conference, 2007.

Figure 6:
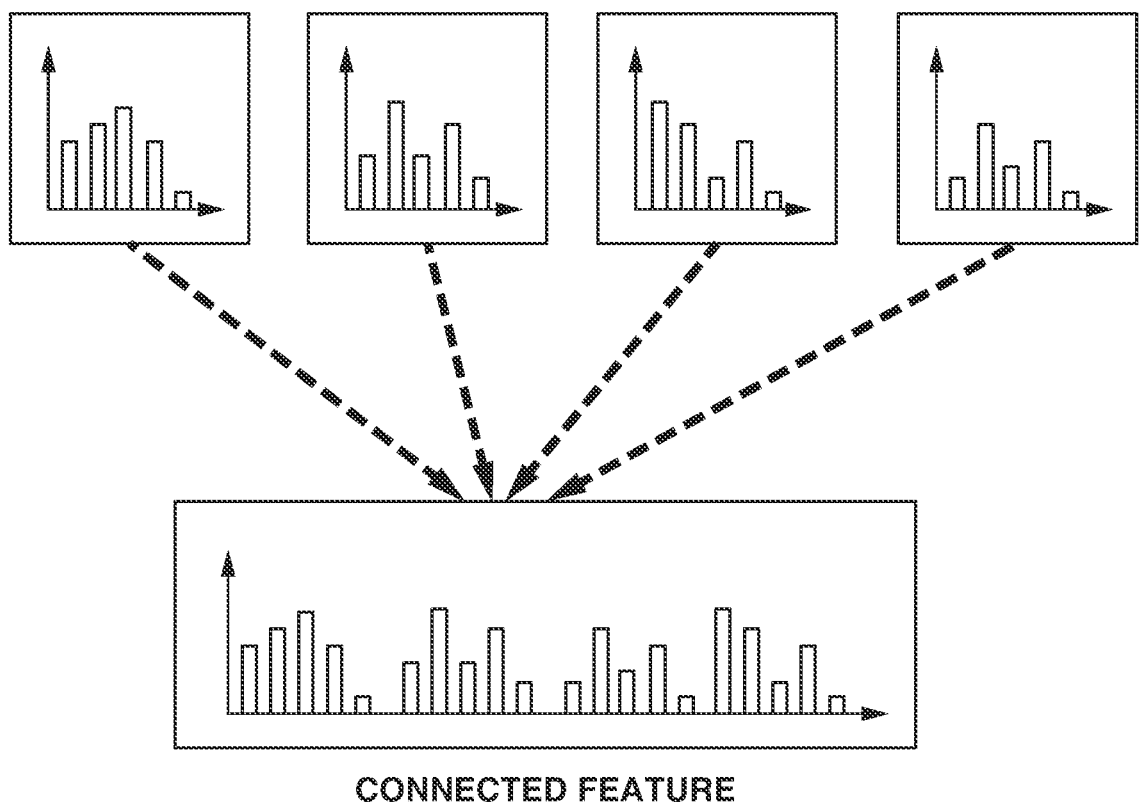
FIG. 6 is a diagram illustrating an example of a connected feature.
Figure 7:
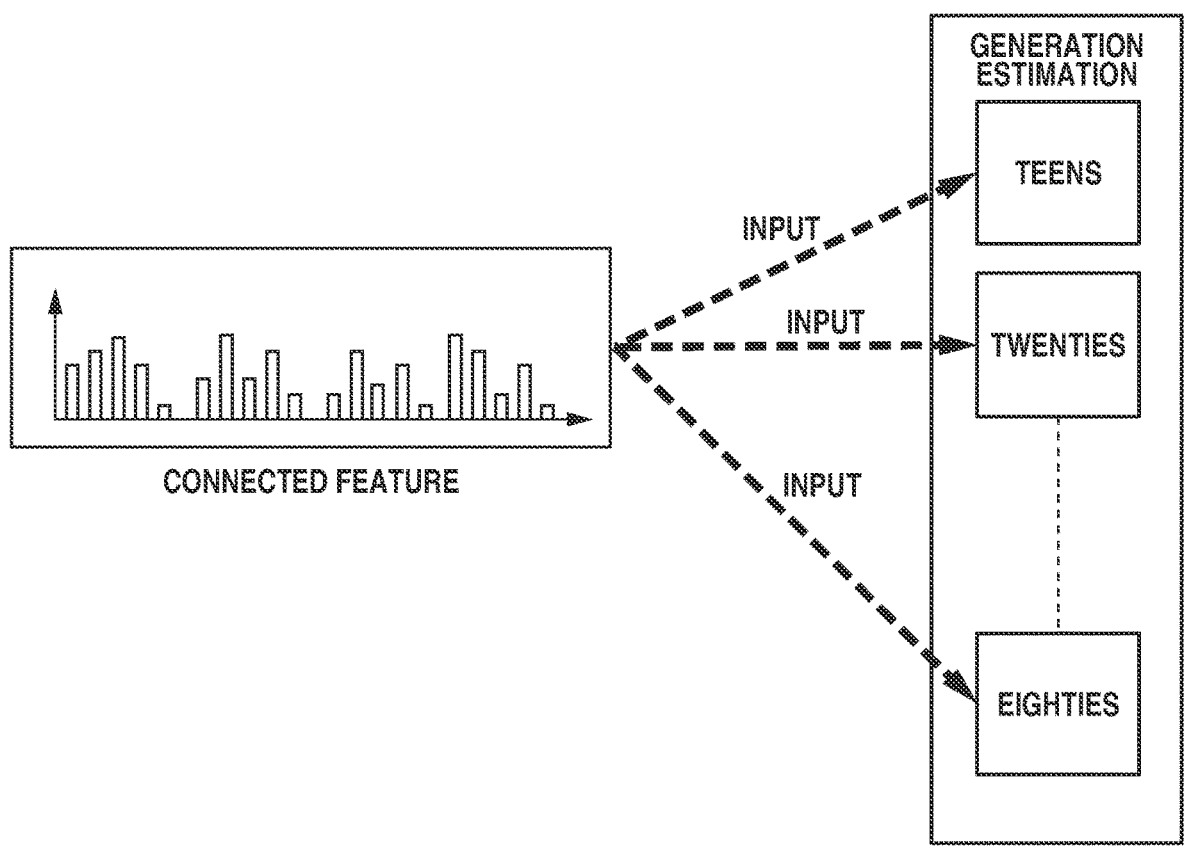
FIG. 7 is a diagram illustrating an example where the connected feature is input to generation estimators.

In step S1400, the generation estimation unit 140 connects the plurality of luminance gradient histograms extracted in step S1300 as illustrated in FIG. 6. The generation estimation unit 140 inputs the resulting connected feature into generation estimators as illustrated in FIG. 7 to calculate a likelihood for each generation that the connected feature falls within the generation by generation. As a technique for estimating likelihood by generation, the generation estimation unit 140 uses a support vector machine (SVM) as discussed in the foregoing paper by Bertozzi et al. For example, a teens estimator can be constructed and trained by luminance gradient histogram features extracted from teens being given a learning label of +1 and by luminance gradient histogram features extracted from other generations being given a learning label of −1.

Figure 8:
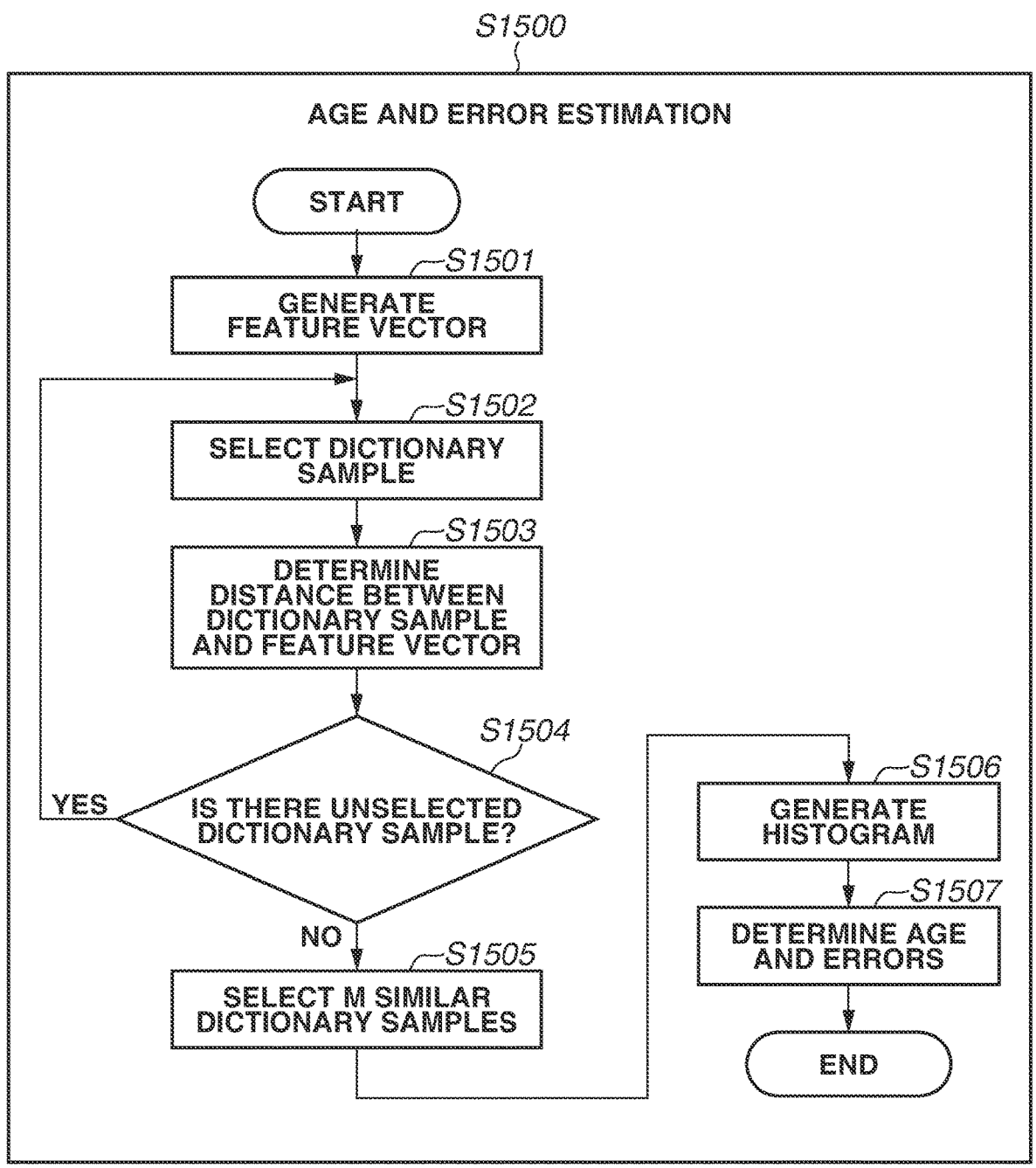
FIG. 8 is a flowchart illustrating details of processing for determining age and errors.

In step S1500, the age and error estimation unit 150 determines age and errors by using the outputs of the respective generator estimators in step S1400. FIG. 8 illustrates details of the processing for determining age and errors in step S1500. A description thereof will be provided below with reference to FIG. 8.

Figure 9:
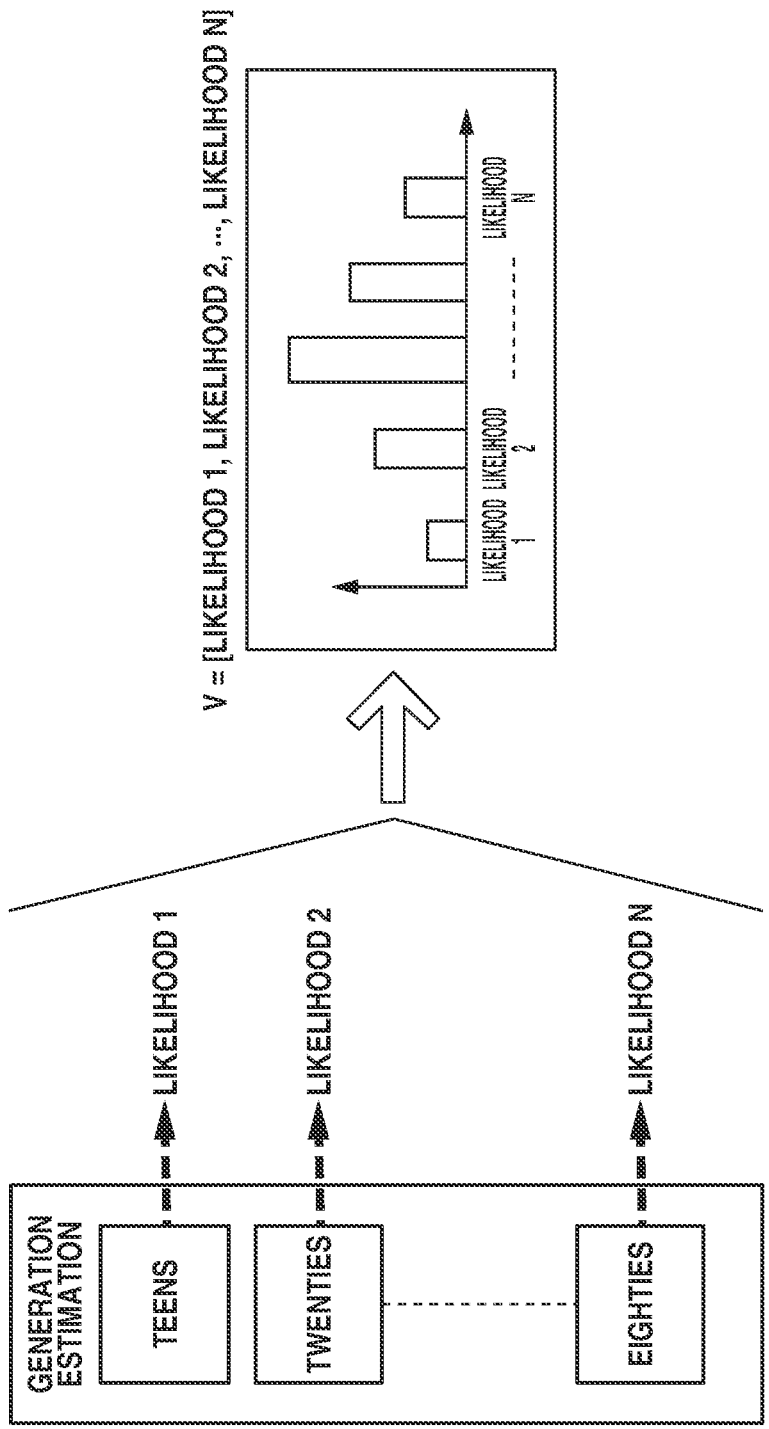
FIG. 9 is a diagram illustrating an example where an N-dimensional feature vector V is generated from N likelihoods.
Figure 10:
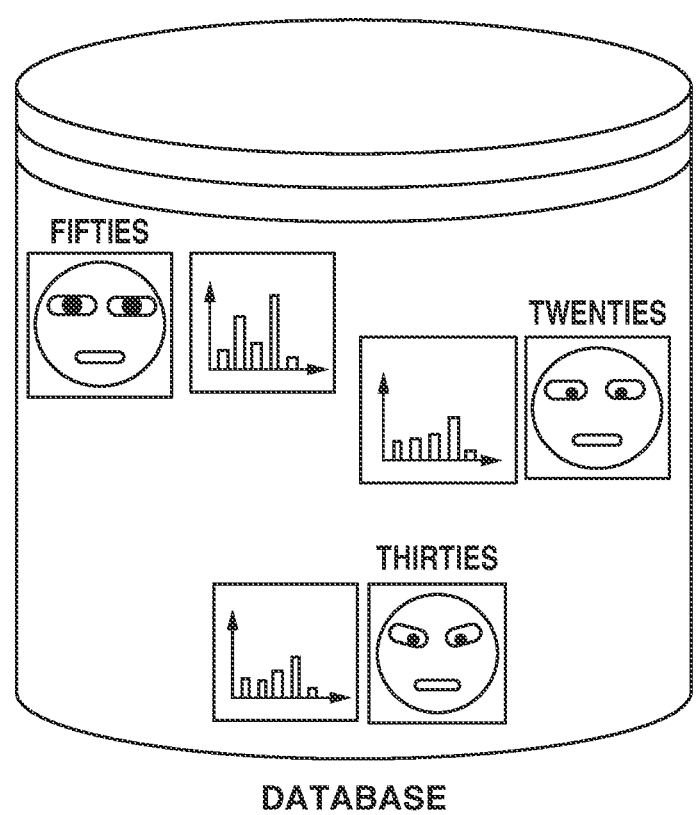
FIG. 10 is a diagram illustrating an example of a database of dictionary samples S.

In step S1501, the age and error estimation unit 150 generates an N-dimensional feature vector $V=[V_1, V_2, \ldots, V_n]$ from N likelihoods output from the respective generation estimators as illustrated in FIG. 9. The age and error estimation unit 150 previously determines N-dimensional feature vectors $S=[S_1, S_2, \ldots, S_n]$, like the N-dimensional feature vector V generated in step S1501, for various faces as illustrated in FIG. 10. The age and error estimation unit 150 stores the N-dimensional feature vectors S and correct ages $Age_{gt}$ in pairs as dictionary samples S in a database. The database is stored, for example, in the storage unit 12.

In step S1502, the age and error estimation unit 150 selects a dictionary sample $S_i=[S_{i1}, S_{i2}, \ldots, S_{in}]$ stored in the database. In step S1503 the age and error estimation unit 150 determines a distance $L_i$ between the N-dimensional feature vector of the dictionary sample $S_i$ selected in step S1502 and the N-dimensional feature vector generated from the input image in step S1501 by Eq. (1):

$$L_i = \sum_{j=1}^{n} |V_j - S_{ij}|. \quad \text{Eq. (1)}$$

Instead of the Manhattan distance, the distance $L_i$ may be a Euclidean distance given by Eq. (2):

$$L_i = \sum_{j=1}^{n} (V_j - S_{ij})^2. \quad \text{Eq. (2)}$$

In step S1504, the age and error estimation unit 150 determines whether there is an unselected dictionary sample from among the dictionary samples S stored in the database. If there is an unselected dictionary sample (YES in step S1504), the processing returns to step S1502. In step S1502, the age and error estimation unit 150 selects the unselected dictionary sample. If all the dictionary samples S have been selected (NO in step S1504), the processing proceeds to step S1505.

Figure 11:
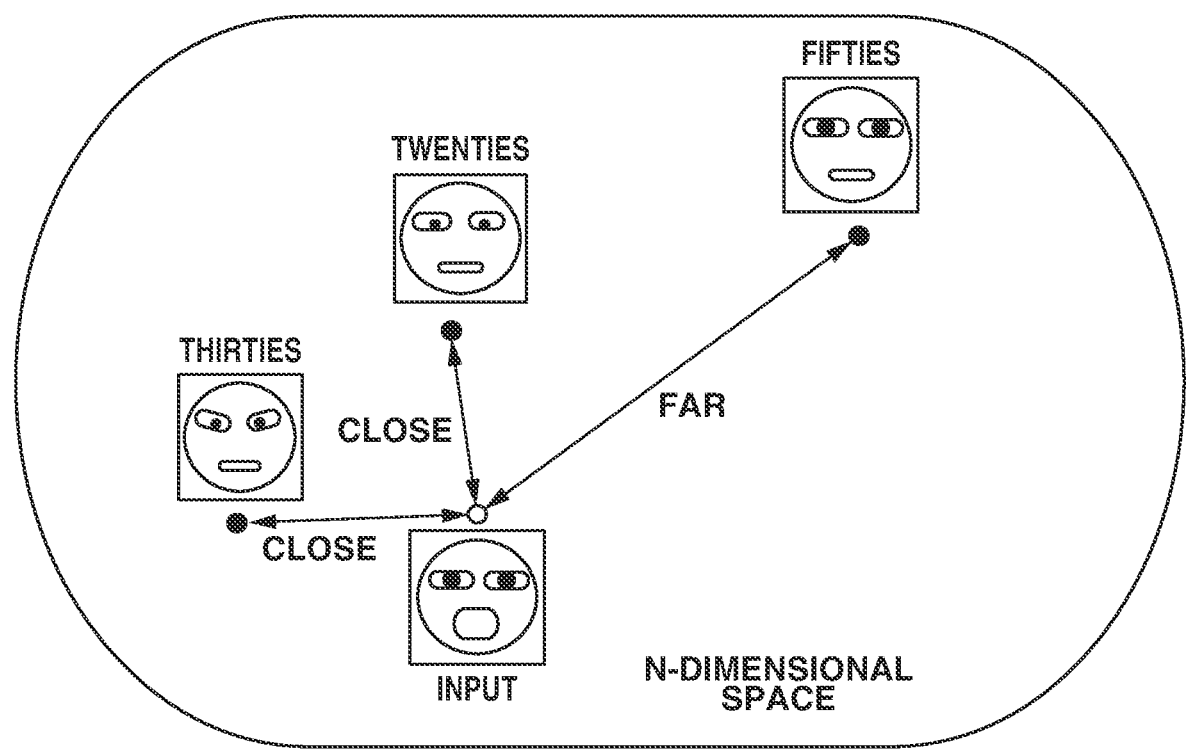
FIG. 11 is a diagram illustrating an example where similar dictionary samples are selected based on distance.

In step S1505, the age and error estimation unit 150 selects M similar dictionary samples by using the distances calculated in step S1503. FIG. 11 illustrates an example where two dictionary samples are selected (M=2).

Figure 12:
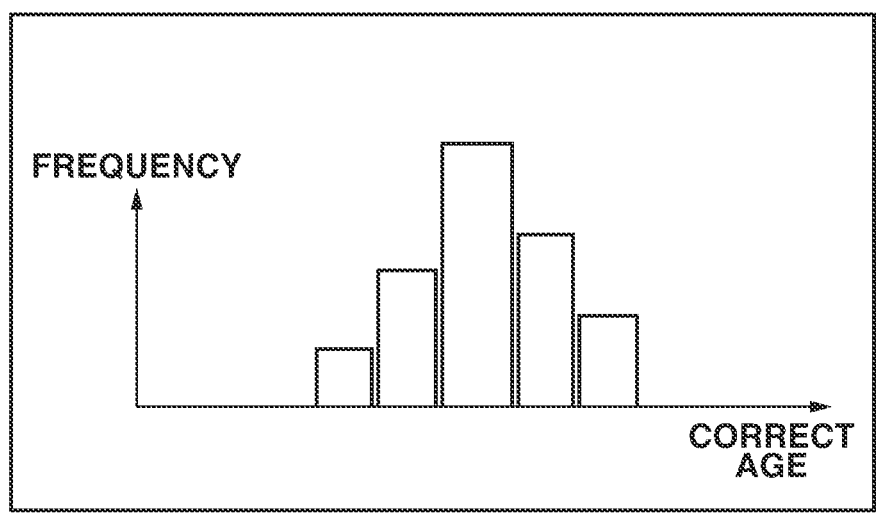
FIG. 12 is a diagram illustrating an example of a histogram with a correct age on the horizontal axis and frequency on the vertical axis.
Figure 13:
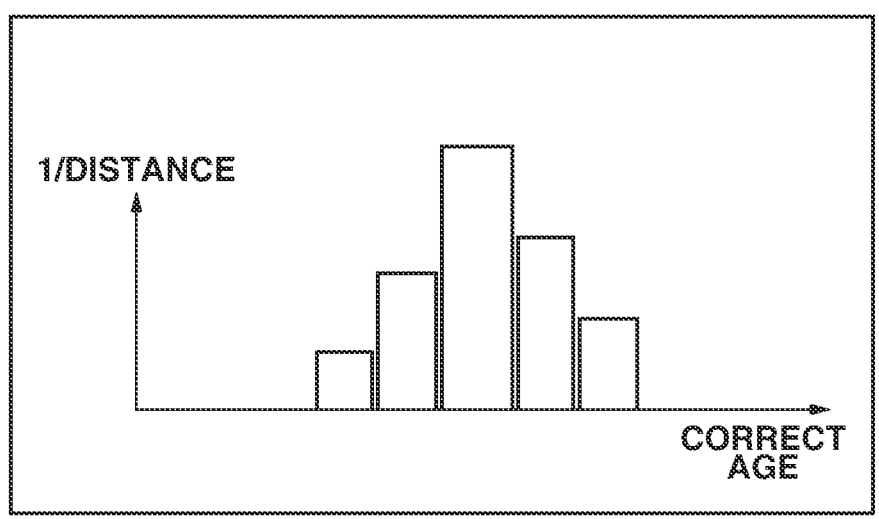
FIG. 13 is a diagram illustrating an example of a histogram with a correct age on the horizontal axis and 1/distance on the vertical axis.

In step S1506, the age and error estimation unit 150 generates a histogram from the correct ages $Age_{gt}$ of the M dictionary samples selected in step S1505. FIG. 12 illustrates a histogram with the correct age $Age_{gt}$ on the horizontal axis and frequency on the vertical axis. As illustrated in FIG. 13, a histogram can be generated with the correct age $Age_{gt}$ on the horizontal axis and 1/distance on the vertical axis. A description will be provided of a case of using the histogram of FIG. 12.

Figure 14:
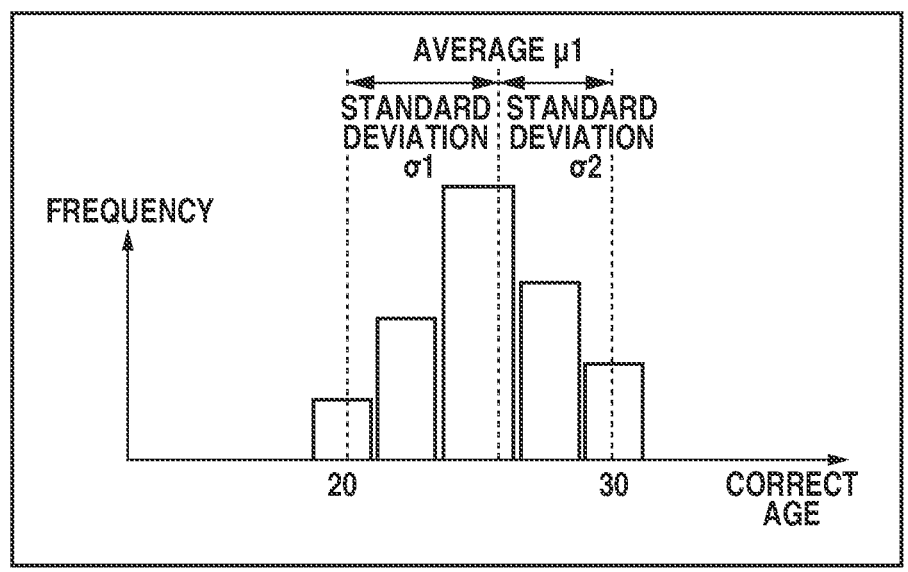
FIG. 14 is a diagram illustrating an example of determination of errors.

In step S1507, the age and error estimation unit 150 determines an average μ1 and standard deviations σ1 and σ2 of the histogram generated in step S1506 as illustrated in FIG. 14. The age and error estimation unit 150 determines the average μ1 to be an estimated age, and the standard deviations σ1 and σ2 to be errors.

Figure 3:
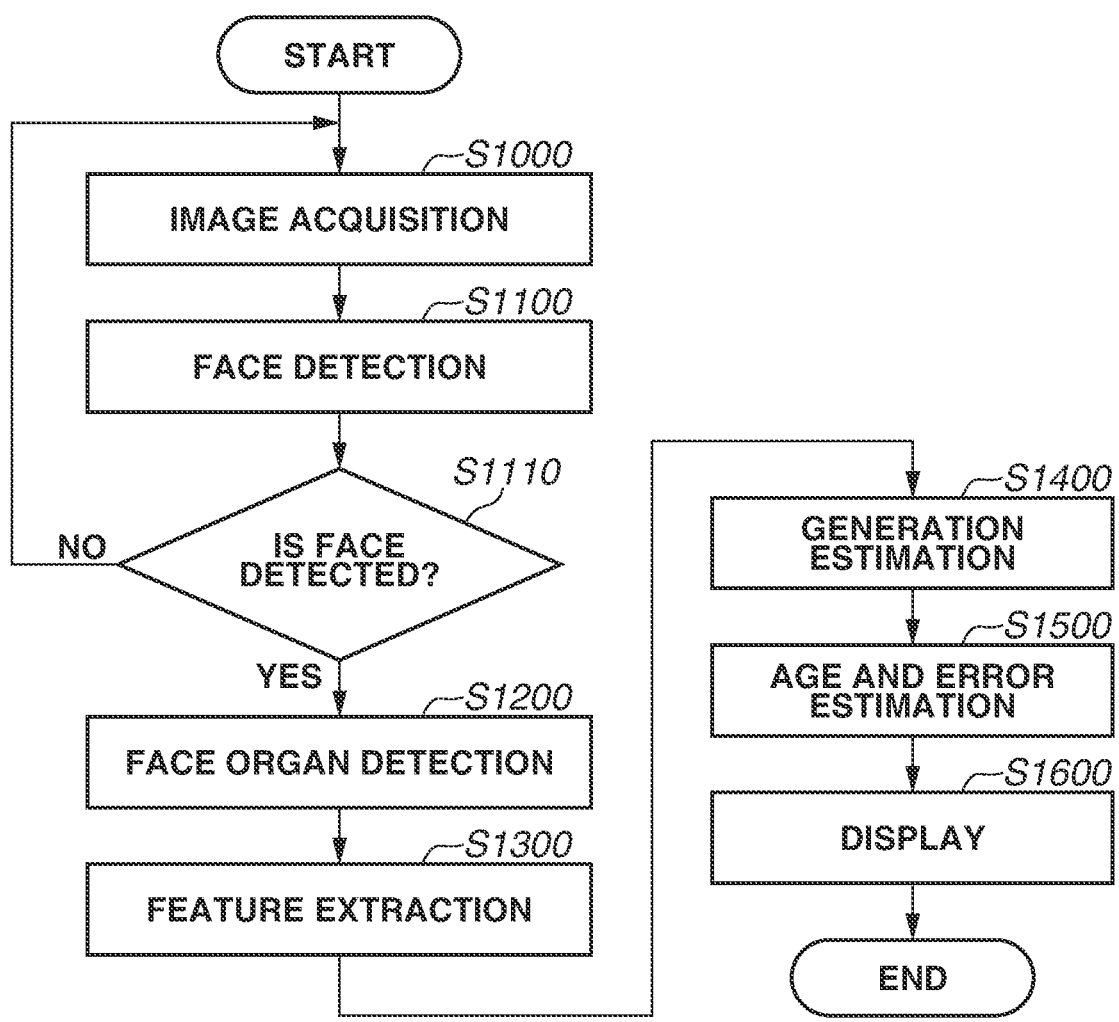
FIG. 3 is a flowchart illustrating an example of information processing.
Figure 15:
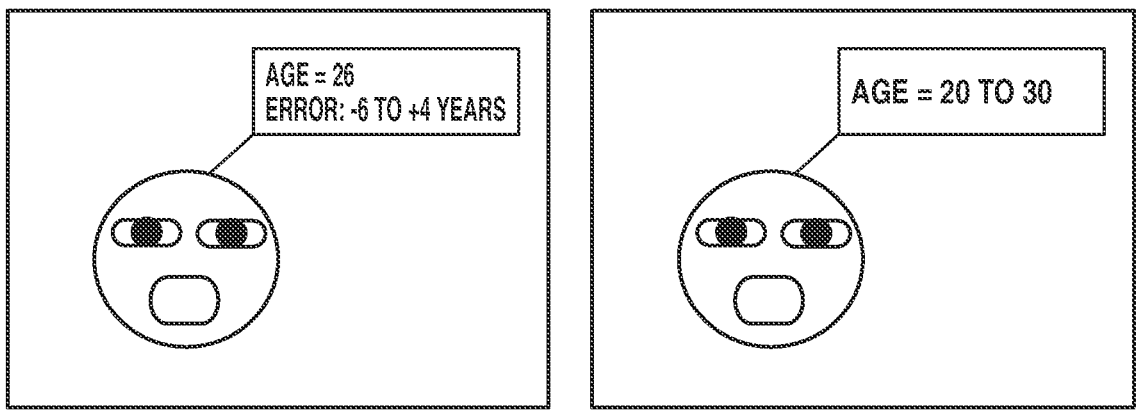
FIG. 15 is a diagram illustrating an example where an estimated age and errors are displayed on a display.

In step S1600 of FIG. 3, the display processing unit 160 displays the estimated age μ1 and the errors σ1 and σ2 determined in step S1507 on the display unit 13, such as a display. The left half of FIG. 15 illustrates an example where the estimated age and the errors are separately displayed. The right half of FIG. 15 illustrates an example where the estimated age and the errors are displayed as a range. The range in the right half of FIG. 15 is an example of a range of ages.

According to the present exemplary embodiment, an error range is determined and displayed along with age. The user can thus find out the possible range of ages of the target and also whether the target tends to be determined to be younger or older.

Figure 16:
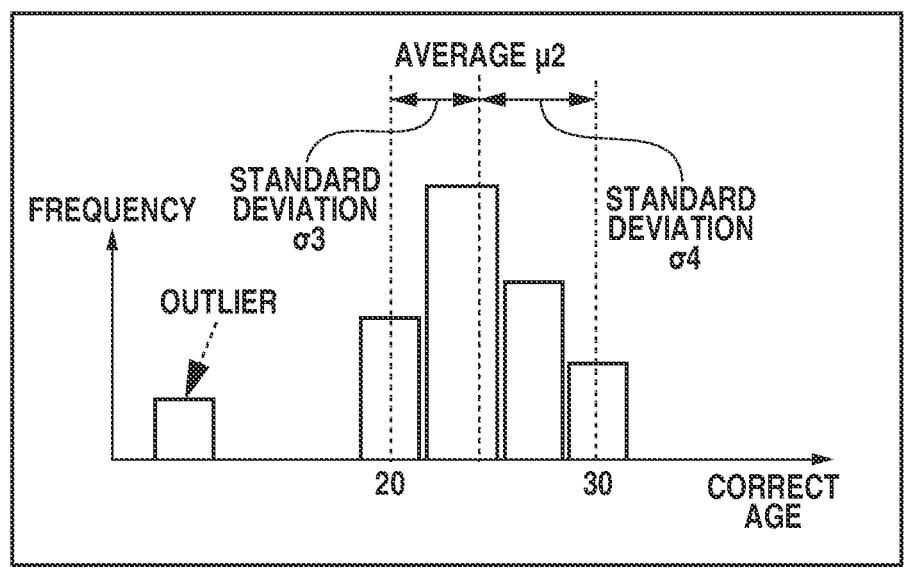
FIG. 16 is a diagram illustrating an example of determining an estimated age and errors while an outlier being excluded.

In the first exemplary embodiment, M dictionary samples are selected based on the distances from the dictionary samples prepared in advance, and an estimated age and errors are determined from a histogram of the selected M dictionary samples. However, a feature amount extracted from an image can be affected by a change in an illumination environment and a change in facial expression. The age and error estimation unit 150 then can determine an estimated age and errors, for example, by analyzing a histogram of the selected M dictionary samples and excluding outliers, if any, as illustrated in FIG. 16.

Figure 17:
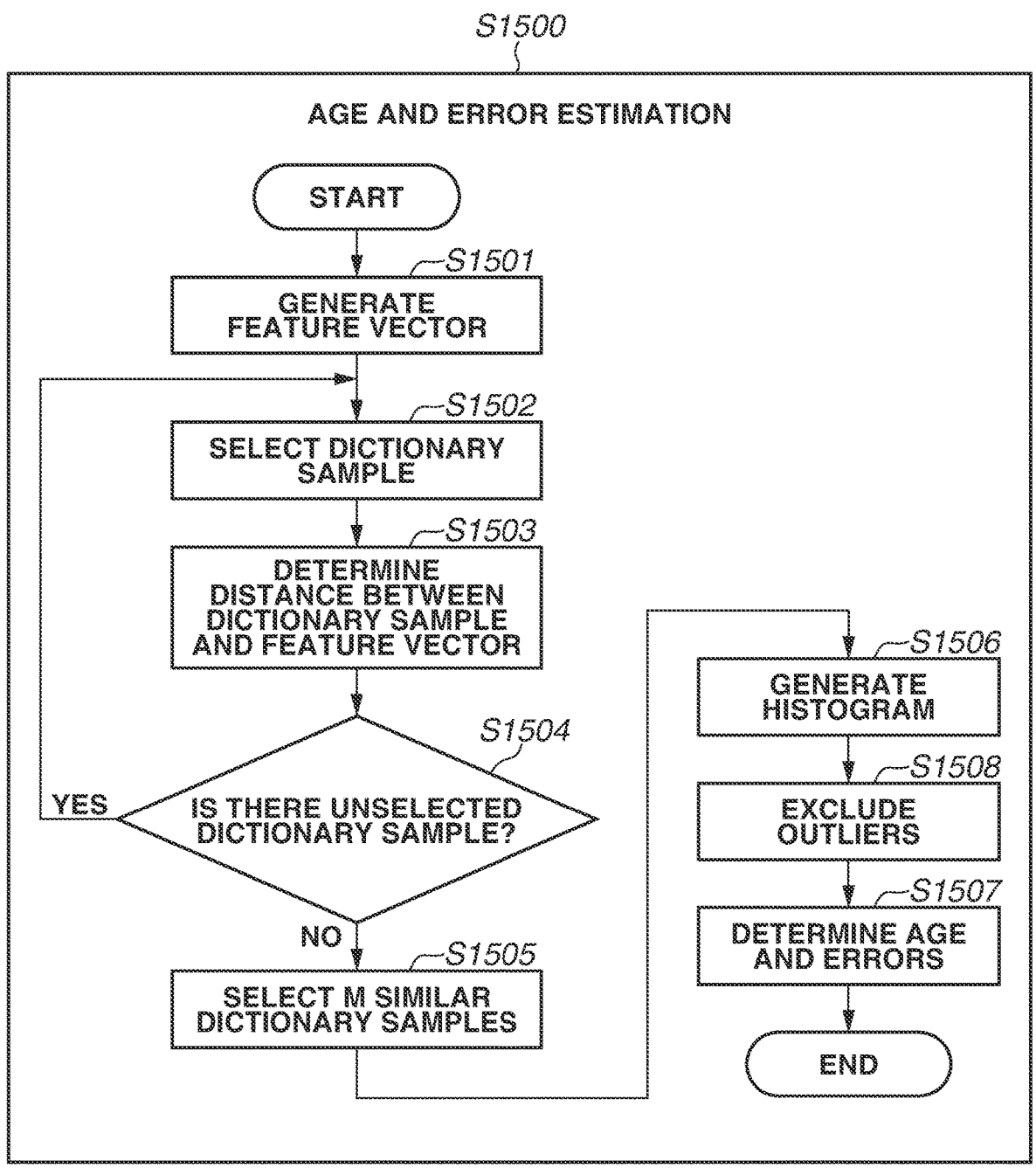
FIG. 17 is a flowchart illustrating processing for determining an age and errors with outlier exclusion.

FIG. 17 is a flowchart of step S1500 of FIG. 3 with outlier exclusion.

In step S1508, the age and error estimation unit 150 analyzes the histogram of the selected M dictionary samples, and excludes outliers if any. As a technique for determining an outlier, the age and error estimation unit 150 can use the SVM discussed in the foregoing paper by Bertozzi et al.

According to the present exemplary embodiment, the effects of a change in the illumination environment and a change in facial expression can be reduced, and an error range can be determined and displayed along with age.

Figure 18:
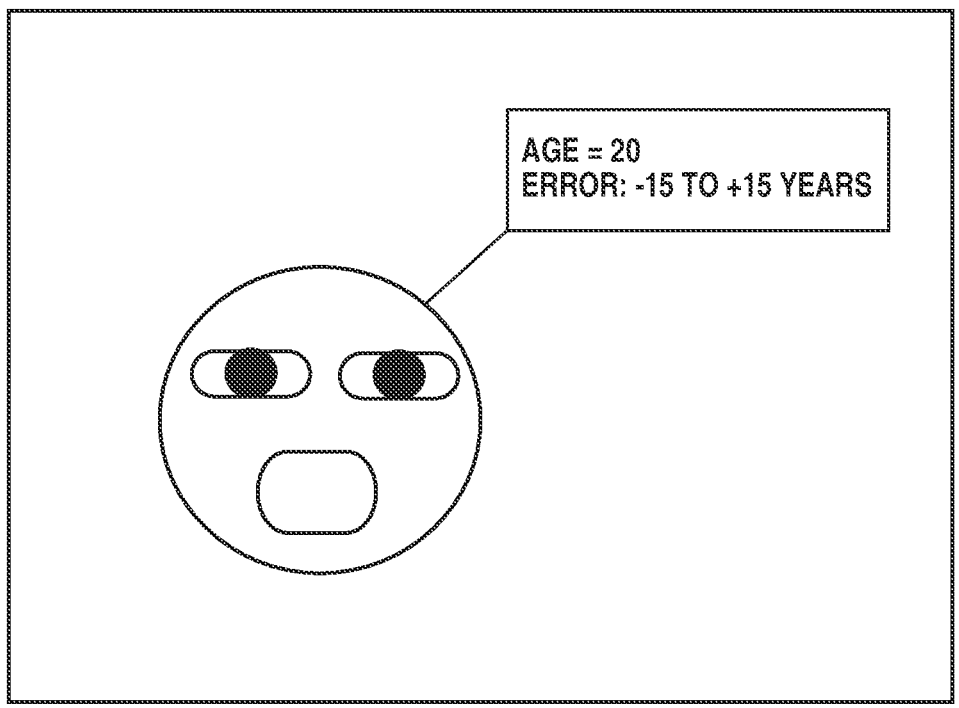
FIG. 18 is a diagram illustrating an example where the error range is wide.

In the first exemplary embodiment, both an estimated age and errors are always determined. However, such a display with a wide error range is equivalent to displaying "unknown age", as in FIG. 18 where the estimated age is 20 and the errors are −15 to +15 years. Displaying "unknown age" can be easier for the user to understand than unreasonably determining and displaying an estimated age and errors.

Figure 19:
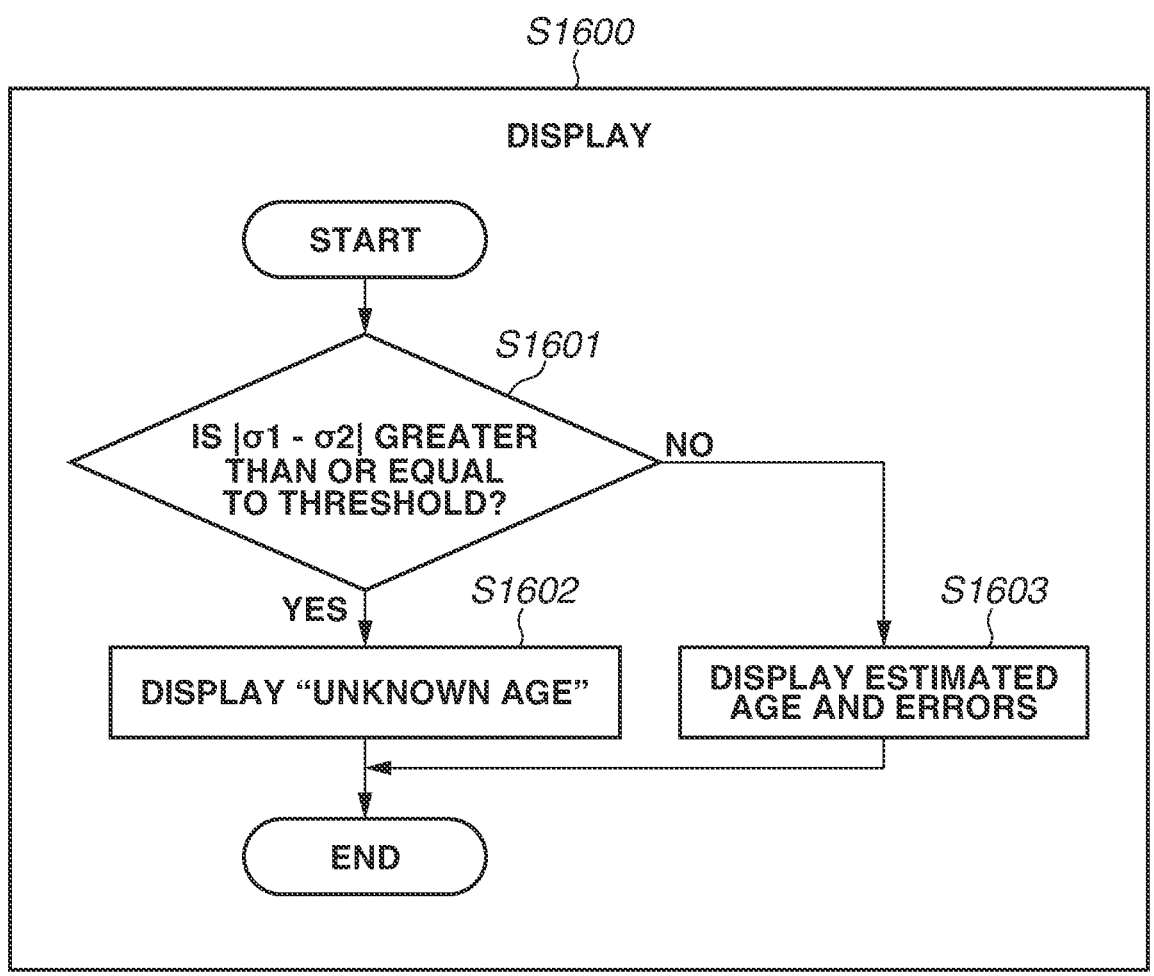
FIG. 19 is a flowchart illustrating details of processing for displaying an estimated age.

FIG. 19 is a flowchart illustrating details of the processing for displaying an estimated age in step S1600 of FIG. 3.

In step S1601, the display processing unit 160 determines a difference between the errors σ1 and σ2, and determines whether the absolute value of the difference is greater than or equal to a predetermined threshold. If the absolute value of the difference is greater than or equal to the predetermined threshold (YES in step S1601), the processing proceeds to step S1602. If the absolute value of the difference is less than the predetermined threshold (NO in step S1601), the processing proceeds to step S1603.

In step S1602, the display processing unit 160 displays "unknown age". Aside from the display "unknown age", any character string equivalent to "not known" can be used.

In step S1603, the display processing unit 160 displays the estimated age and the errors as in the first and second exemplary embodiments. Alternatively, a range of ages can be displayed based on the estimated age and the errors.

According to the present exemplary embodiment, an age and errors are displayed only if reliability is high. If reliability is low, a message "unknown age" is displayed. This enables the user to immediately determine the reliability of the displayed data.

According to the foregoing exemplary embodiments, age and errors can be more accurately estimated from an image including a face. The estimations can be output as well.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-012406, filed Jan. 29, 2018, which is hereby incorporated by reference herein in its entirety.

What is claimed is:

1. An information processing apparatus comprising:
a controller including a processor and a memory, wherein the controller is configured to perform operations including:
extracting, as an extraction, a feature from an image including a face,
estimating, as a first estimation, a likelihood for each generation, based on the feature of the face,
selecting, as a selection, a sample from a plurality of samples including a combination of likelihoods and a ground truth of age based on a combination of likelihoods estimated by the first estimation, and
estimating, as a second estimation, an estimated age of the face and an error range based on the selected sample.

2. The information processing apparatus according to claim 1, wherein the selected sample is similar to the combination of the likelihoods estimated by the first estimation.

3. The information processing apparatus according to claim 1, wherein the second estimation estimates the estimated age and the error range based on the ground truth of age included in the selected sample.

4. The information processing apparatus according to claim 1, wherein the selection selects one or more samples from the plurality of samples.

5. The information processing apparatus according to claim 4, wherein the second estimation generates a histogram of the ground truth of age included in the plurality of samples selected by the selection and estimates the estimated age and the error range based on the generated histogram.

6. The information processing apparatus according to claim 5, wherein the second estimation estimates the estimated age and the error range with an outlier being excluded from the generated histogram.

7. The information processing apparatus according to claim 5, wherein the second estimation estimates standard deviation of the generated histogram as the error range.

8. The information processing apparatus according to claim 4, wherein the second estimation estimates an average of the ground truth of age included in the plurality of samples as the estimated age.

9. The information processing apparatus according to claim 4, wherein the selection selects a predetermined number of samples at close distances.

10. The information processing apparatus according to claim 1, wherein the performed operations further include separately displaying, as a display, the estimated age and the error range.

11. The information processing apparatus according to claim 10, wherein the performed operations further include determining, as a determination, whether the error range is greater than or equal to a threshold.

12. The information processing apparatus according to claim 11, wherein, in a case where the error range is greater than or equal to the threshold, the display displays that age is unknown.

13. The information processing apparatus according to claim 11, wherein, in a case where the error range is less than the threshold, the display separately displays the estimated age and the error range.

14. The information processing apparatus according to claim 11, wherein, in a case where the error range is less than the threshold, the display displays a range of ages based on the estimated age and the error range.

15. The information processing apparatus according to claim 10, wherein the display displays the estimated age and the error range in association with the face.

16. The information processing apparatus according to claim 1, wherein the performed operations further include displaying, as a display, a range of ages based on the estimated age and the error range.

17. The information processing apparatus according to claim 1, wherein extracting includes detecting an organ from the image including the face, and extracting the feature based on a position of the organ.

18. The information processing apparatus according to claim 1, wherein selecting includes selecting a sample based on a distance between vectors, with the combination of the likelihoods estimated by the first estimation and generation-specific combination of likelihoods in each of the plurality of samples as the respective vectors.

19. A method for an information processing apparatus, the method comprising:
  extracting, as an extraction, a feature from an image including a face;
  estimating, as a first estimation, a likelihood for each generation, based on the feature of the face;
  selecting, as a selection, a sample from a plurality of samples including a combination of likelihoods and a ground truth of age based on a combination of likelihoods estimated by the first estimation; and
  estimating, as a second estimation, an estimated age of the face and an error range based on the selected sample.

20. A non-transitory computer-readable storage medium storing a program for causing a computer to execute a method for an information processing apparatus, the method comprising:
  extracting, as an extraction, a feature from an image including a face;
  estimating, as a first estimation, a likelihood for each generation, based on the feature of the face;
  selecting, as a selection, a sample from a plurality of samples including a combination of likelihoods and a ground truth of age based on a combination of likelihoods estimated by the first estimation; and
  estimating, as a second estimation, an estimated age of the face and an error range based on the selected sample.

* * * * *